(12) United States Patent
Kim et al.

(10) Patent No.: US 9,086,752 B2
(45) Date of Patent: Jul. 21, 2015

(54) TOUCH SENSOR

(75) Inventors: Mu-Gyeom Kim, Yongin (KR); Chang-Mo Park, Yongin (KR); Il-Soo Park, Yongin (KR); Yong-Soo Lee, Yongin (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 1304 days.

(21) Appl. No.: 12/912,638

(22) Filed: Oct. 26, 2010

(65) Prior Publication Data

US 2011/0163979 A1 Jul. 7, 2011

(30) Foreign Application Priority Data

Jan. 7, 2010 (KR) ........................ 10-2010-0001314

(51) Int. Cl.
*H01L 35/24* (2006.01)
*H01L 51/00* (2006.01)
*G06F 3/041* (2006.01)

(52) U.S. Cl.
CPC .................................. *G06F 3/0412* (2013.01)

(58) Field of Classification Search
CPC ..... H01L 35/24; H01L 51/00; H01L 51/0504; H01L 51/0036; H01L 51/0541; H01L 51/5012
USPC .......................................... 257/40; 345/173
See application file for complete search history.

(56) References Cited

U.S. PATENT DOCUMENTS

| | | | |
|---|---|---|---|
| 6,819,316 B2 | 11/2004 | Schulz et al. | |
| 8,188,982 B2 * | 5/2012 | You et al. | 345/173 |
| 2006/0001092 A1 | 1/2006 | Kim | |
| 2007/0257254 A1 | 11/2007 | Yang et al. | |
| 2008/0197350 A1 | 8/2008 | Park et al. | |
| 2008/0278070 A1 | 11/2008 | Kim | |
| 2009/0115741 A1 * | 5/2009 | Wang et al. | 345/173 |
| 2009/0250708 A1 | 10/2009 | Kudo et al. | |
| 2010/0148993 A1 * | 6/2010 | Lee | 341/20 |
| 2011/0216256 A1 * | 9/2011 | Lin et al. | 349/27 |

FOREIGN PATENT DOCUMENTS

| | | |
|---|---|---|
| KR | 10-2006-0028251 A | 3/2006 |
| KR | 10-0626008 B1 | 9/2006 |

(Continued)

OTHER PUBLICATIONS

Korean Registration Determination Certificate dated Apr. 29, 2011 for Korean Patent Application No. KR 10-2010-0001314 which corresponds to captioned U.S. Appl. No. 12/912,638.

*Primary Examiner* — Phuc Dang (74) *Attorney, Agent, or Firm* — Knobbe, Martens, Olson & Bear, LLP (57) ABSTRACT

A touch sensor and an organic light-emitting display including the sensor are disclosed. In one embodiment, the touch sensor includes i) a substrate, ii) a sensing unit formed on or over the substrate and containing hydrogen ions, iii) a touch sensor active layer formed on or above the sensing unit and iv) a touch sensor source electrode and a touch sensor drain electrode that are electrically connected to the touch sensor active layer. The touch sensor further includes a protective layer covering the touch sensor source electrode and the touch sensor drain electrode, and an opposite electrode formed on the protective layer, wherein at least part of the opposite electrode is formed substantially directly above the touch sensor active layer.

8 Claims, 4 Drawing Sheets

(56) References Cited

FOREIGN PATENT DOCUMENTS

| KR | 10-2007-0068092 A | 6/2007 |
| KR | 10-0762682 B1 | 9/2007 |
| KR | 10-2008-0076608 A | 8/2008 |
| KR | 10-2008-0099684 A | 11/2008 |
| KR | 10-2009-0102671 A | 9/2009 |

* cited by examiner

FIG. 8

TOUCH SENSOR

CROSS-REFERENCE TO RELATED PATENT APPLICATION

This application claims the benefit of Korean Patent Application No. 10-2010-0001314, filed on Jan. 7, 2010, in the Korean Intellectual Property Office, the disclosure of which is incorporated herein in its entirety by reference.

BACKGROUND OF THE INVENTION

1. Field of the Invention

The described technology generally relates to an organic light-emitting display, and more particularly, to a touch sensor and an organic light-emitting display including the touch sensor.

2. Description of the Related Technology

Recently, conventional displays have been replaced by portable and thin flat displays. Electroluminescent devices are flat and self-luminescent and have been considered as next-generation displays since they have a wide viewing angle, good contrast, and a quick response time. Also, organic light-emitting displays have better brightness, a higher driving voltage, and faster response time than inorganic light-emitting displays, and can provide multicolored images.

SUMMARY OF CERTAIN INVENTIVE ASPECTS

One aspect of the present invention is a touch sensor and an organic light-emitting display apparatus including the touch sensor.

Another aspect is a touch sensor including a substrate; a sensing unit disposed on the substrate and comprising hydrogen; a touch sensor active layer formed on or above the sensing unit; a touch sensor source electrode and a touch sensor drain electrode that are electrically connected to the touch sensor active layer; a protective layer formed of an insulating material to cover the touch sensor source electrode and the touch sensor drain electrode; and an opposite electrode disposed on the protective layer and formed to at least partially overlap with the touch sensor active layer.

The touch sensor may further include an insulating layer disposed between the protective layer and the opposite electrode, the insulating layer comprising an aperture part. The aperture part may be formed to at least partially overlap with the touch sensor active layer, and the opposite electrode contacts the protective layer via the aperture part.

The aperture part may be formed to at least partially overlap with a part of the touch sensor active layer being not covered by the touch sensor source electrode and the touch sensor drain electrode.

The sensing unit may include a silicon-based oxide or a silicon-based nitride. The touch sensor may further include an etch stopper disposed between the touch sensor active layer, the touch sensor source electrode, and the touch sensor drain electrode. The etch stopper may be formed to partially overlap with the sensing unit.

The touch sensor may further include an intermediate insulating layer disposed between the sensing unit and the touch sensor active layer. The intermediate insulating layer may include a contact hole for exposing a predetermined part of the sensing unit. The sensing unit and the touch sensor active layer may contact each other via the contact hole. The touch sensor may further include a light blocking layer disposed between the substrate and the sensing unit.

Another aspect is an organic light-emitting display apparatus including a substrate; a sensing unit disposed on the substrate and comprising hydrogen; a touch sensor active layer formed on or above the sensing unit; a touch sensor source electrode and a touch sensor drain electrode that are electrically connected to the touch sensor active layer; a protective layer formed of an insulating material to cover the touch sensor source electrode and the touch sensor drain electrode; a pixel electrode disposed on the protective layer to not overlap with the touch sensor active layer; a pixel defining layer disposed on the pixel electrode, the pixel defining layer comprising a first aperture part for exposing a predetermined part of the pixel electrode and a second aperture part overlapping at least partially with the touch sensor active layer; an intermediate layer disposed in the first aperture part, the intermediate layer comprising an organic light-emitting layer; and an opposite electrode disposed on the intermediate layer and the second aperture part.

The second aperture part may be formed to at least partially overlap with a part of the touch sensor active layer being not covered by the touch sensor source electrode and the touch sensor drain electrode.

The opposite electrode may contact the protective layer via the second aperture part. The protective layer may be a planarization layer.

The touch sensor may further include a thin film transistor formed below the protective layer to be electrically connected to the pixel electrode. The thin film transistor may include an active layer, a gate electrode, a gate insulating layer, a source electrode, and a drain electrode.

The gate insulating layer may be disposed between the gate electrode and the active layer and between the sensing unit and the touch sensor active layer. The active layer and the touch sensor active layer may be formed of the same material.

The source electrode and the drain electrode, and the touch sensor electrode and the touch sensor drain electrode may be formed of the same material. The sensing unit may include a silicon-based oxide or a silicon-based nitride.

The touch sensor may further include an etch stopper disposed between the touch sensor active layer, the touch sensor source electrode, and the touch sensor drain electrode. The etch stopper may be formed to at least partially overlap with the sensing unit.

The touch sensor may further include an intermediate insulating layer disposed between the sensing unit and the touch sensor active layer. The intermediate insulating layer comprises may include a contact hole for exposing a predetermined part of the sensing unit. The sensing unit and the touch sensor active layer may contact each other via the contact hole. The touch sensor may further include a light blocking layer disposed between the substrate and the sensing unit.

Another aspect is a touch sensor comprising: a substrate; a sensing unit formed on or over the substrate and containing hydrogen ions; a touch sensor active layer formed on or above the sensing unit; a touch sensor source electrode and a touch sensor drain electrode that are electrically connected to the touch sensor active layer; a protective layer covering the touch sensor source electrode and the touch sensor drain electrode; and an opposite electrode formed on the protective layer, wherein at least part of the opposite electrode is formed substantially directly above the touch sensor active layer.

The above sensor further comprises an insulating layer formed between the protective layer and the opposite electrode, wherein a recess is formed in the insulating layer, wherein at least part of the recess is formed directly above the touch sensor active layer, and wherein the opposite electrode contacts the protective layer via the recess. In the above sensor, part of the touch sensor active layer is covered by neither of the touch sensor source and drain electrodes, and wherein at least part of the recess is formed directly above the portion of the touch sensor active layer which is not covered by the touch sensor source and drain electrodes.

In the above sensor, the sensing unit is formed of a silicon-based oxide or a silicon-based nitride. The above sensor further comprises: a first etch stopper formed between i) the touch sensor active layer and ii) the touch sensor source and drain electrodes, wherein the first etch stopper contacts the protective layer, and wherein the touch sensor active layer does not contact the protective layer; and a second etch stopper having i) a bottom surface, ii) a top surface and iii) a side surface formed between the bottom and top surfaces, wherein the bottom surface is closer to the substrate than the top surface, wherein the top surface of the second etch stopper contacts i) a bottom surface of the touch sensor source electrode and ii) a bottom surface of the touch sensor drain electrode, and wherein the side surface of the second etch stopper contacts a side surface of the touch sensor active layer.

The above sensor further comprises an intermediate insulating layer at least part of which is formed between the sensing unit and the touch sensor active layer. In the above sensor, a contact hole is defined in the intermediate insulating layer, and wherein the sensing unit and the touch sensor active layer contact each other via the contact hole. The above sensor further comprises a light blocking layer formed between the substrate and the sensing unit, wherein the light blocking layer is formed substantially directly below the sensing unit, wherein the light blocking layer has a first length, wherein the sensing unit has a second length, wherein the first and second lengths are defined in a direction substantially parallel with the substrate, and wherein the first and second lengths are substantially the same.

Another aspect is an organic light-emitting display apparatus comprising: a substrate; a sensing layer formed on the substrate and containing hydrogen ions; a touch sensor active layer formed on or above the sensing unit; a touch sensor source electrode and a touch sensor drain electrode that are electrically connected to the touch sensor active layer; a protective layer covering the touch sensor source electrode and the touch sensor drain electrode; a pixel electrode formed on the protective layer, wherein the pixel electrode is not formed substantially directly above the touch sensor active layer; a pixel defining layer formed on the pixel electrode, wherein first and second recesses are defined in the pixel defining layer, wherein the first and second recesses are separated from each other, and wherein at least part of the second recess is formed substantially directly above the touch sensor active layer; an intermediate layer formed in the first recess, wherein the intermediate layer is formed on the pixel electrode and comprises an organic light-emitting layer; and an opposite electrode formed on the intermediate layer and the pixel defining layer, wherein at least part of the opposite electrode is formed in the second recess.

In the above apparatus, part of the touch sensor active layer is covered by neither of the touch sensor source and drain electrodes, and wherein at least part of the second recess is formed directly above the portion of the touch sensor active layer which is not covered by the touch sensor source and drain electrodes. The above apparatus further comprises a thin film transistor formed below the protective layer and electrically connected to the pixel electrode, wherein the thin film transistor comprises an active layer, a gate electrode, a gate insulating layer, a source electrode, and a drain electrode. In the above apparatus, the gate insulating layer is disposed between the gate electrode and the active layer and between the sensing layer and the touch sensor active layer. In the above apparatus, the source electrode and the drain electrode, the touch sensor electrode and the touch sensor drain electrode are formed of the same material.

In the above apparatus, the distance between i) at least one of the source and drain electrodes and ii) the substrate is substantially the same as the distance between i) at least one of the touch sensor and drain electrodes and ii) substrate. In the above apparatus, the sensing layer is formed of a silicon-based oxide or a silicon-based nitride. The above apparatus further comprises an etch stopper layer formed between i) the touch sensor active layer and ii) the touch sensor source and drain electrodes, wherein the etch stopper layer contacts the touch sensor active layer, and wherein the touch sensor active layer does not contact the protective layer. The above apparatus further comprises an intermediate insulating layer at least part of which is interposed between the sensing unit and the touch sensor active layer.

Another aspect is an organic light-emitting display comprising: a substrate; a thin film transistor formed over the substrate, wherein the thin film transistor comprises an active layer, a gate electrode, a gate insulating layer, a source electrode, and a drain electrode; an organic light emitting element electrically connected to the thin film transistor; and a sensing element formed over the substrate, wherein the sensing element is spaced apart from i) the gate, source and drain electrodes and ii) the active layer, wherein the gate insulating layer extends to the sensing element, and wherein the sensing element is configured to sense that the substrate is touched or approached.

In the above display, the sensing element comprises: a sensing layer formed over the substrate, wherein the sensing layer is spaced apart from the gate, source and drain electrodes and active layer, and wherein the sensing layer contains ions; a touch sensor active layer formed over the sensing unit, wherein the ions are configured to move toward the touch sensor active layer when the substrate is touched or approached by an object or a user; a touch sensor source electrode and a touch sensor drain electrode that are electrically connected to the touch sensor active layer, wherein an electrical current is configured to flow between the touch sensor source and drain electrodes; a protective layer covering the touch sensor source electrode and the touch sensor drain electrode; and an opposite electrode formed on the protective layer, wherein at least part of the opposite electrode is formed substantially directly above the touch sensor active layer.

Another aspect is a method of manufacturing the above display, wherein at least one of the sensing element is formed substantially simultaneously with at least one element of the thin film transistor.

DETAILED DESCRIPTION OF CERTAIN INVENTIVE EMBODIMENTS

Research has been conducted into a method of applying a touch panel function to an organic light-emitting display. If the touch panel function is incorporated, the organic light-emitting display can also be used as an input device when the display panel is touched by a user's finger or a pen. The incorporation of the touch panel function is an additional procedure that may interfere with the manufacturing process of the organic light-emitting display, which can result in reduced product yield and degraded performance.

Figure 1:
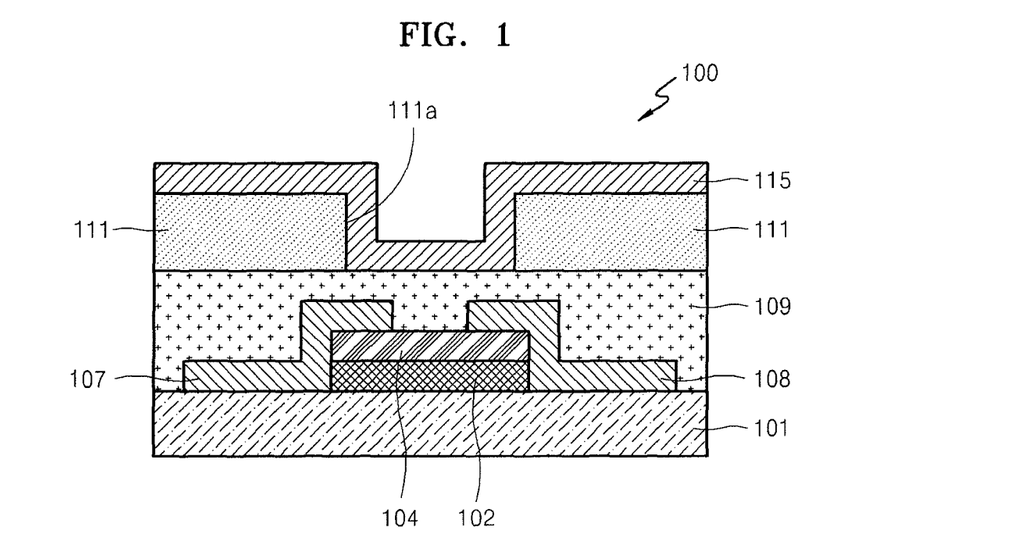
FIG. 1 is a schematic cross-sectional view of a touch sensor according to an embodiment of the present invention.

FIG. 1 is a schematic cross-sectional view of a touch sensor 100 according to an embodiment of the present invention. Referring to FIG. 1, the touch sensor 100 includes a substrate 101, a sensing unit (or a sensing layer) 102, a touch sensor active layer 104, a touch sensor source electrode 107, a touch sensor drain electrode 108, a protective layer 109, and an opposite electrode 115.

The substrate 101 may be formed of a transparent glass material (e.g., $SiO_2$) or a transparent plastic material. The transparent plastic material may be at least one of the following: polyethersulphone (PES), polyacrylate (PAR), polyetherimide (PEI), polyethyelenen napthalate (PEN), polyethyeleneterepthalate (PET), polyphenylene sulfide (PPS), polyallylate, polyimide, polycarbonate (PC), cellulose triacetate (TAC), and cellulose acetate propionate (CAP), which are insulating inorganic materials.

The sensing unit 102 is formed on the substrate 101. In one embodiment, the sensing unit 102 contains hydrogen ions. If touching by a user toward the substrate 101 is sensed, then hydrogen ions in the sensing unit 102 may move toward the touch sensor active layer 104. In this embodiment, the sensing unit 102 may be formed of any of various materials, such as SiNx and SiOx. the sensing unit 102 may contain other types of ions than hydrogen so long as they can move toward the touch sensor active layer 104 based on a touch. This option applies to the other disclosed embodiments.

The touch sensor active layer 104 is formed on the sensing unit 102. The touch sensor active layer 104 may be formed of an oxide material. Also, the touch sensor active layer 104 may include amorphous silicon or polycrystalline silicon.

The touch sensor source electrode 107 and the touch sensor drain electrode 108 are formed on the touch sensor active layer 104 and the substrate 101. The touch sensor source electrode 107 and the touch sensor drain electrode 108 may be formed of, but are not limited thereto, at least one of: Au, Pd, Pt, Ni, Rh, Ru, Ir, and Os, or an alloy of two or more metals, such as an Al alloy, a Mo alloy, an Al:Nd alloy, or a MoW alloy.

An upper surface of the touch sensor active layer 104 is not completely covered by the touch sensor source electrode 107 and the touch sensor drain electrode 108 and thus has an exposed part. The exposed part of the upper surface of the touch sensor active layer 104 is not covered by the touch sensor source electrode 107 or the touch sensor drain electrode 108. In one embodiment, this exposed part acts as a channel through which current flows when a predetermined voltage or a voltage greater than the predetermined voltage is applied to the touch sensor source electrode 107 and the touch sensor drain electrode 108.

The protective layer 109 is formed on i) the touch sensor source electrode 107, ii) the touch sensor drain electrode 108, the exposed part of the upper surface of the touch sensor active layer 104, and the substrate 101. The protective layer 109 may be formed of any of various insulating materials and may include an organic or inorganic material.

An insulating layer 111 is formed on the protective layer 109, and the opposite electrode 115 is formed on the insulating layer 11. The insulating layer 111 includes an aperture part (or a recess) 111a and the opposite electrode 115 is formed on the insulating layer 111 having the aperture part 111a. The aperture part 111a is formed to at least partially overlap with a part of the touch sensor active layer 104. For example, the aperture part 111a is formed at least partially over the exposed part of the upper surface of the touch sensor active layer 104, which is not covered by the touch sensor source electrode 107 or the touch sensor drain electrode 108. In one embodiment, at least part of the aperture part 111a is formed substantially directly above the touch sensor active layer 104. This feature applies to the remaining disclosed embodiments.

If a voltage is applied to the opposite electrode 115, the opposite electrode 115 in the aperture part 111a may act as a gate electrode. That is, if predetermined voltages are respectively applied to the touch sensor source electrode 107, the touch sensor drain electrode 108, and the opposite electrode 115, then the exposed part of the upper surface of the touch sensor active layer 104 may act as a channel in which current may flow from the touch sensor source electrode 107 to the touch sensor drain electrode 108.

The opposite electrode 115 may be formed of any of various conductive materials and may be formed of at least one of: Ag, Mg, Al, Pt, Pd, Au, Ni, Nd, Ir, Cr, Li, and Ca.

If the touch sensor 100 is accessed (or approached) or touched by an object, such as a user's hand or a charged touch pen, toward the substrate 101, then the touch sensor 100 may sense movement of electric charges generated by the accessing or touching by the object. Then the touch sensor 100 may recognize the movement of the electric charges and determine that the touch sensor 100 is accessed or touched by the object and the location of the accessing or touching, based on the recognition.

For example, before the accessing or touching by the object, a predetermined voltage is applied to the opposite electrode 115 and voltages are applied to the touch sensor source electrode 107 and the touch sensor drain electrode 108, respectively. If the difference between the voltages applied to the touch sensor source electrode 107 and the touch sensor drain electrode 108 is greater than or equal to a predetermined level, then the touch sensor active layer 104 may act as a channel in which may current flow from the touch sensor source electrode 107 to the touch sensor drain electrode 108. A threshold voltage $V_{th}$ is applied to the opposite electrode 115 when the current begins to flow from the touch sensor source electrode 107 to the touch sensor drain electrode 108.

If the voltages applied to the opposite electrode 115, the touch sensor source electrode 107, and the touch sensor drain electrode 108 are maintained at constant levels while the current flows from the touch sensor source electrode 107 to the touch sensor drain electrode 108, then the current flowing from the touch sensor source electrode 107 to the touch sensor drain electrode 108 is also maintained at a constant level.

If the user's hand accesses or touches the substrate 101, then the hydrogen ions move in the sensing unit 102. The user's hand may be charged with, for example, negative (−) electricity. Thus, if the user's hand accesses the substrate 101, then negative ions from among the hydrogen ions in the sensing unit 102 move away from the user's hand, i.e., toward a direction along which the sensing unit 102 contacts the touch sensor active layer 104. The negative ions change distribution of electric charges in the touch sensor active layer 104, thus leading to a change in the level of the current flowing through the touch sensor active layer 104. Thus, the electrical characteristics of the touch sensor active layer 104, which acts as the channel, change, and thus, the level of the current flowing from the touch sensor source electrode 107 to the touch sensor drain electrode 108 changes. Accordingly, the touch sensor 100 may sense the accessing or touching by sensing a change in the level of the current and a location in which such a change occurs.

Figure 2:
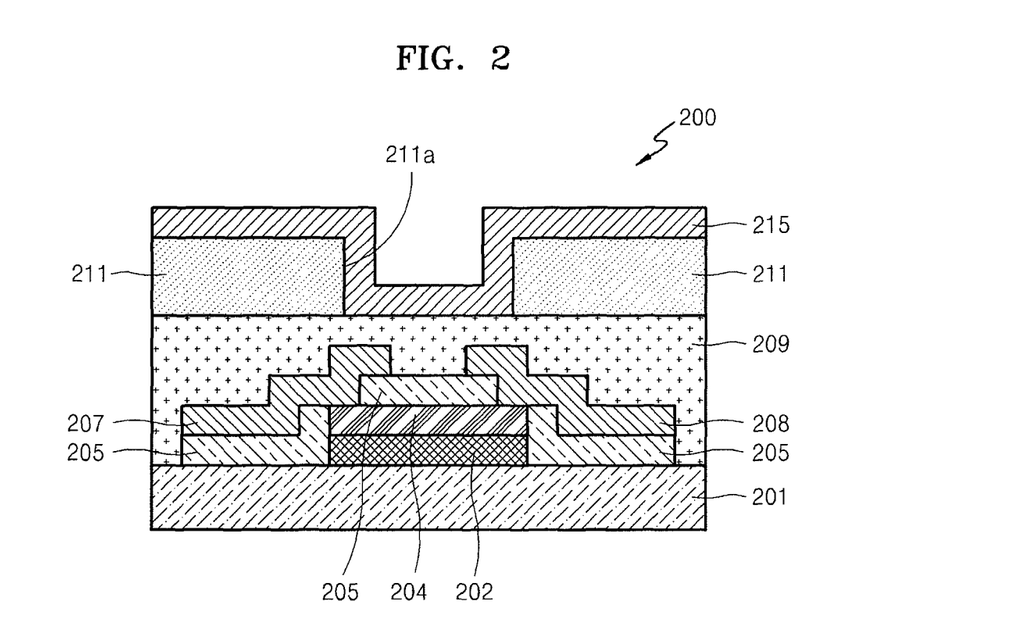
FIG. 2 is a schematic cross-sectional view of a touch sensor according to another embodiment of the present invention.

Furthermore, if a user touches the substrate 101, then the threshold voltage $V_{th}$ causing current to flow from the touch sensor source electrode 107 to the touch sensor drain electrode 108 may change. Accordingly, the touching by the user may be sensed by sensing a change in the threshold voltage $V_{th}$. FIG. 2 is a schematic cross-sectional view of a touch sensor 200 according to another embodiment of the present invention. For convenience of explanation, the touch sensor 200 according to the current embodiment will be described focusing on differences between the touch sensor 200 and the touch sensor 100 of FIG. 1. Referring to FIG. 2, the touch sensor 200 includes a substrate 201, a sensing unit 202, a touch sensor active layer 204, an etch stopper 205, a touch sensor source electrode 207, a touch sensor drain electrode 208, a protective layer 209, and an opposite electrode 215.

The sensing unit 202 is formed on the substrate 201. In one embodiment, the sensing unit 202 contains hydrogen ions. The touch sensor active layer 204 is formed on the sensing unit 202. The etch stopper 205 is formed on the touch sensor active layer 204 and the substrate 201. In one embodiment, the etch stopper 205 includes a first etch stopper and a second etch stopper. In this embodiment, the first etch stopper is formed between i) the touch sensor active layer 204 and ii) the touch sensor source and drain electrodes 207 and 208. Further, the top surface of the second etch stopper contacts a bottom surface of the touch sensor source electrode 207 and a bottom surface of the touch sensor drain electrode 208, and the side surface of the second etch stopper contacts a side surface of the touch sensor active layer 204, as shown in FIG. 2. This applies to the embodiments shown in FIGS. 4 and 6.

The touch sensor source electrode 207 and the touch sensor drain electrode 208 are formed on the etch stopper 205. The touch sensor source electrode 207 and the touch sensor drain electrode 208 contact a portion of the touch sensor active layer 204 not covered by the etch stopper 205.

In this embodiment, a portion of an upper surface of the touch sensor active layer 204, which contacts the etch stopper 205 and may act as a channel, is protected by the etch stopper 205. For example, the etch stopper 205 prevents the upper surface of the touch sensor active layer 204 from being damaged when the touch sensor source electrode 207 and the touch sensor drain electrode 208 are patterned using an etch process.

The protective layer 209 is formed on the touch sensor source electrode 207, the touch sensor drain electrode 208, the etch stopper 205 and the substrate 201. An insulating layer 211 is formed on the protective layer 209 and the opposite electrode 215 is formed on the insulating layer 211. The insulating layer 211 includes an aperture part (or a recess) 211a, and the opposite electrode 215 is formed on the insulating layer 211 having the aperture part 211a. In this embodiment, the aperture part 211a is formed to at least partially overlap with the touch sensor active layer 204. For example, the aperture part 211a is formed to overlap with a portion of the touch sensor active layer 204 not covered by the touch sensor source electrode 207 or the touch sensor drain electrode 208.

Similar to the previous embodiment, if a user accesses or touches the substrate 201, then the accessing or touching by the user may be sensed by detecting movement of hydrogen ions in the sensing unit 202.

Figure 3:
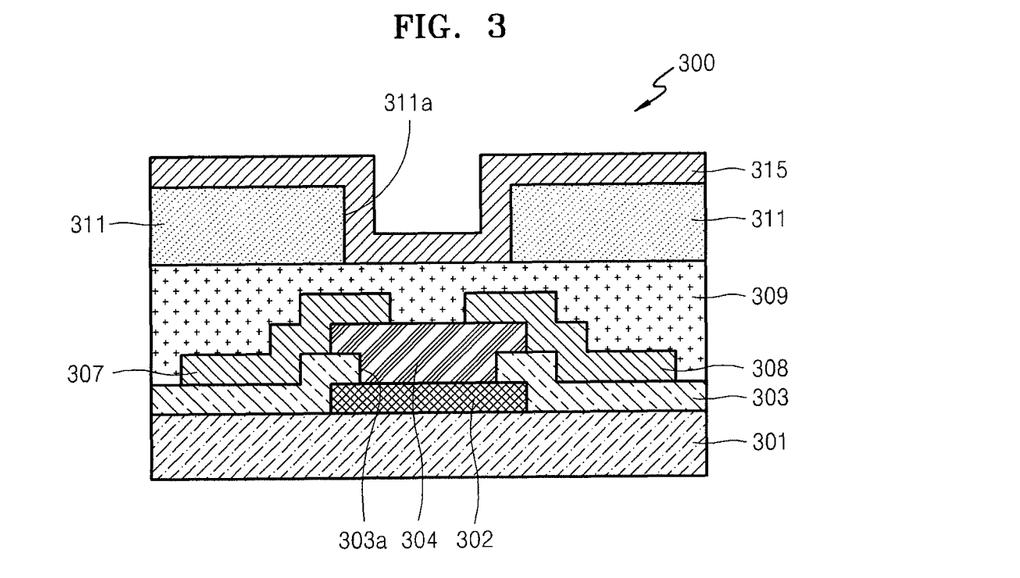
FIG. 3 is a schematic cross-sectional view of a touch sensor according to another embodiment of the present invention.

FIG. 3 is a schematic cross-sectional view of a touch sensor 300 according to another embodiment of the present invention. For convenience of explanation, the touch sensor 300 according to the current embodiment will be described focusing on differences between the touch sensor 300 and the touch sensors 100 and 200 of FIGS. 1 and 2. Referring to FIG. 3, the touch sensor 300 includes a substrate 301, a sensing unit 302, an intermediate insulating layer 303, a touch sensor active layer 304, a touch sensor source electrode 307, a touch sensor drain electrode 308, a protective layer 309, and an opposite electrode 315.

The sensing unit 302 is formed on the substrate 301. The intermediate insulating layer 303 having a contact hole 303a is formed on the sensing unit 302 and the substrate 301. The touch sensor active layer 304 is formed on the intermediate insulating layer 303 and the sensing unit 302. The touch sensor active layer 304 contacts the sensing unit 302 via the contact hole 303a. The intermediate insulating layer 303 may prevent the touch sensor source electrode 307 and the touch sensor drain electrode 308 from contacting the sensing unit 302.

The touch sensor source electrode 307 and the touch sensor drain electrode 308 are formed on the touch sensor active layer 304 and the intermediate insulating layer 303. The protective layer 309 is formed on the touch sensor source electrode 307, the touch sensor drain electrode 308, the touch sensor active layer 304 and the intermediate insulating layer 303. An insulating layer 311 is formed on the protective layer 309 and the opposite electrode 315 is formed on the insulating layer 311.

The insulating layer 311 includes an aperture part (or a recess) 311a, and the opposite electrode 315 is formed on the insulating layer 311 having the aperture part 311a. The aperture part 311a is formed to at least partially overlap with the touch sensor active layer 304.

Similar to the previous embodiments, if a user accesses or touches the substrate 301, the accessing or the touching may be sensed by checking movement of hydrogen ions in the sensing unit 302.

Figure 4:
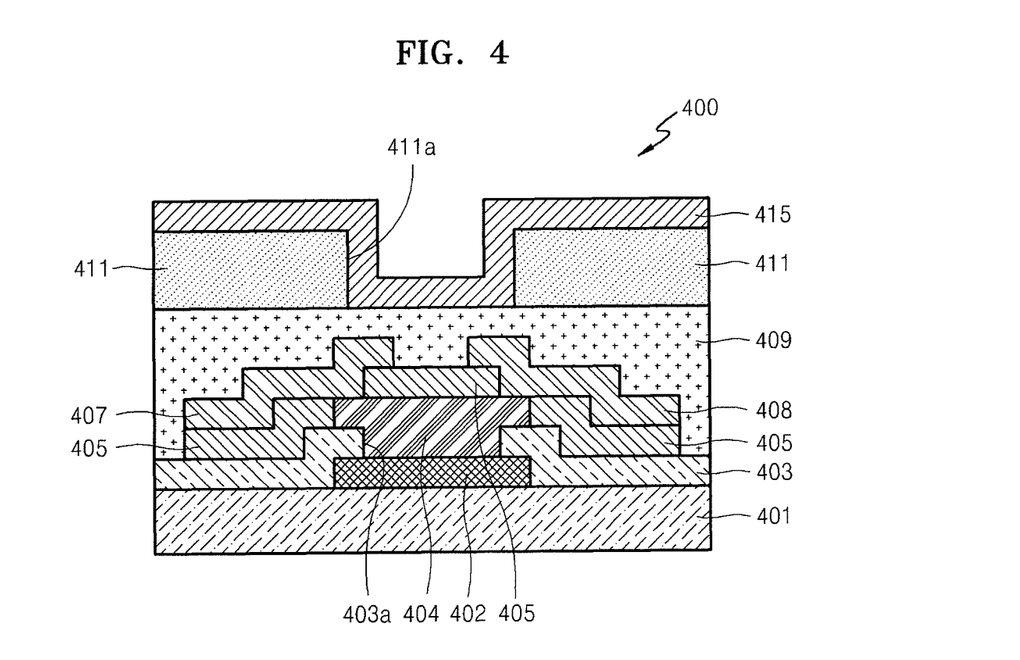
FIG. 4 is a schematic cross-sectional view of a touch sensor according to another embodiment of the present invention.

FIG. 4 is a schematic cross-sectional view of a touch sensor 400 according to another embodiment of the present invention. For convenience of explanation, the touch sensor 400 according to the current embodiment will be described focusing on differences between the touch sensor 400 and the touch sensors 100 to 300 of FIGS. 1 to 3. Referring to FIG. 4, the touch sensor 400 includes a substrate 401, a sensing unit 402, an intermediate insulating layer 403, a touch sensor active layer 404, an etch stopper 405, a touch sensor source electrode 407, a touch sensor drain electrode 408, a protective layer 409, and an opposite electrode 415.

The sensing unit 402 is formed on the substrate 401. The intermediate insulating layer 403 having a contact hole 403a is formed on the sensing unit 402 and the substrate 401. The touch sensor active layer 404 is formed on the intermediate insulating layer 403 and the sensing unit 402. The touch sensor active layer 404 contacts the sensing unit 401 via the contact hole 403a.

The etch stopper 405 is formed on the touch sensor active layer 404 and the intermediate insulating layer 403.

The touch sensor source electrode 407 and the touch sensor drain electrode 408 are formed on the etch stopper 405. The touch sensor source electrode 407 and the touch sensor drain electrode 408 contacts a portion of the touch sensor active layer 404 not covered by the etch stopper 405.

A portion of an upper surface of the touch sensor active layer 404, which contacts the etch stopper 405 and may act as a channel, is protected by the etch stopper 405.

The protective layer 409 is formed on the touch sensor source electrode 407 and the touch sensor drain electrode 408. The insulating layer 411 is formed on the protective layer 409 and the opposite electrode 415 is formed on the insulating layer 411.

The insulating layer 411 includes an aperture part (or a recess) 411a, and the opposite electrode 415 is formed on the insulating layer 411 having the aperture part 411a. The aperture part 411a is formed to at least partially overlap with the touch sensor active layer 404.

In the touch sensor 400 according to the current embodiment, if a user accesses or touches the substrate 401, then the accessing or touching may be sensed by checking movement of hydrogen ions in the sensing unit 402.

Figure 5:
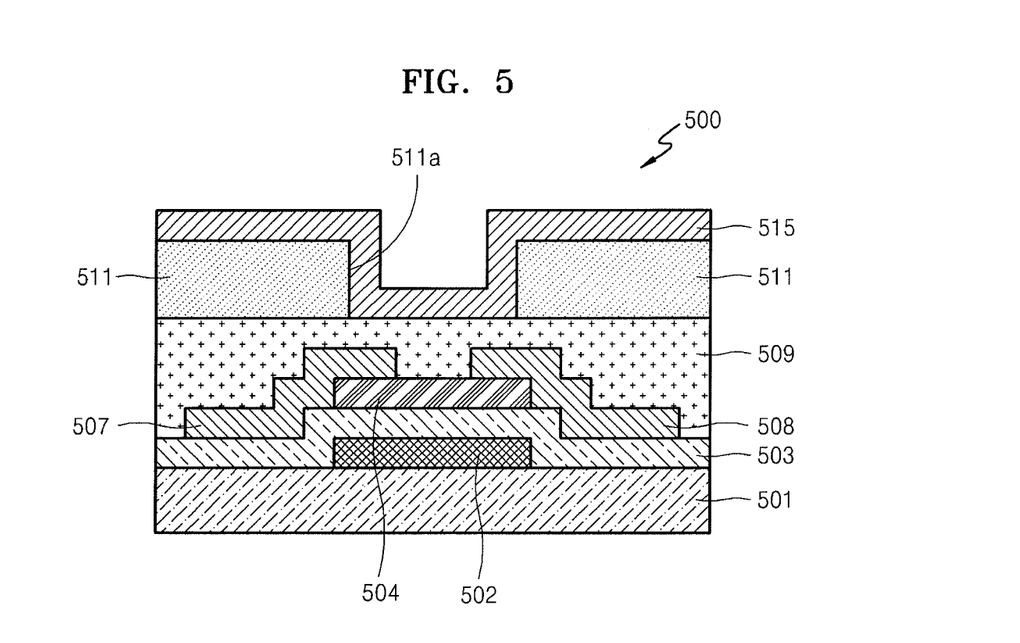
FIG. 5 is a schematic cross-sectional view of a touch sensor according to another embodiment of the present invention.

FIG. 5 is a schematic cross-sectional view of a touch sensor 500 according to another embodiment of the present invention. For convenience of explanation, the touch sensor 500 according to the current embodiment will be described focusing on differences between the touch sensor 500 and the touch sensors 100 to 400 of FIGS. 1 to 4. Referring to FIG. 5, the touch sensor 500 includes a substrate 501, a sensing unit 502, a touch sensor active layer 504, an intermediate insulating layer 503, a touch sensor source electrode 507, a touch sensor drain electrode 508, a protective layer 509, and an opposite electrode 515.

The sensing unit 502 is formed on the substrate 501. The intermediate insulating layer 503 is formed on the sensing unit 502 and the substrate 501. In this embodiment, the intermediate insulating layer 503 substantially completely covers the sensing unit 502. The touch sensor active layer 504 is formed on the intermediate insulating layer 503. The touch sensor active layer 504 does not contact the sensing unit 502.

The touch sensor source electrode 507 and the touch sensor drain electrode 508 are formed on the touch sensor active layer 504 and the intermediate insulating layer 503. The protective layer 509 is formed on the touch sensor source electrode 507, the touch sensor drain electrode 508, the touch sensor active layer 504 and the intermediate insulating layer 503. An insulating layer 511 is formed on the protective layer 509 and the opposite electrode 515 is formed on the insulating layer 511.

The insulating layer 511 includes an aperture part (or a recess) 511a, and the opposite electrode 515 is formed on the insulating layer 511 having the aperture part 511a. The aperture part 511a is formed to at least partially overlap with the touch sensor active layer 504.

Similar to the previous embodiments, if a user accesses or touches the substrate 501, then the accessing or touching may be sensed since hydrogen ions move in the sensing unit 502 and thus the electrical characteristics of the touch sensor active layer 504 changes.

Figure 6:
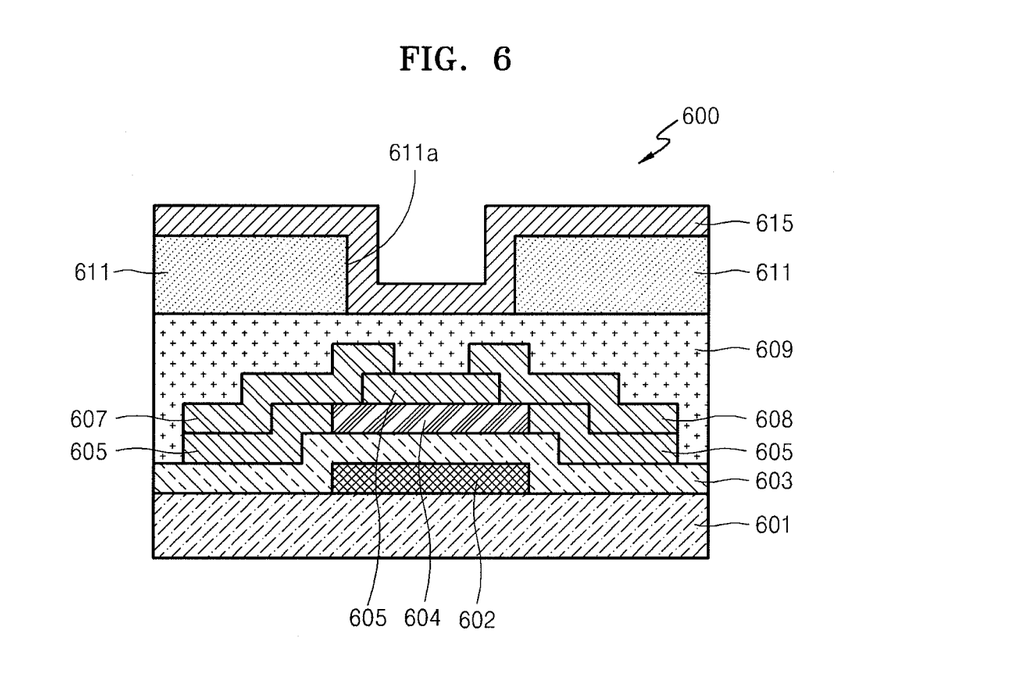
FIG. 6 is a schematic cross-sectional view of a touch sensor according to another embodiment of the present invention.

FIG. 6 is a schematic cross-sectional view of a touch sensor 600 according to another embodiment of the present invention. For convenience of explanation, the touch sensor 600 according to the current embodiment will be described focusing on differences between the touch sensor 600 and the touch sensors 100 to 500 of FIGS. 1 to 5. Referring to FIG. 6, the touch sensor 600 includes a substrate 601, a sensing unit 602, a touch sensor active layer 604, an intermediate insulating layer 603, an etch stopper 605, a touch sensor source electrode 607, a touch sensor drain electrode 608, a protective layer 609, and an opposite electrode 615.

The sensing unit 602 is formed on the substrate 601. The intermediate insulating layer 603 is formed on the sensing unit 602. In this embodiment, the intermediate insulating layer 603 substantially completely covers the sensing unit 602. The touch sensor active layer 604 is formed on the intermediate insulating layer 603. The touch sensor active layer 604 does not contact the sensing unit 602.

The etch stopper 605 is formed on the touch sensor active layer 604 and the intermediate insulating layer 603.

The touch sensor source electrode 607 and the touch sensor drain electrode 608 are formed on the etch stopper 605 and the touch sensor active layer 604. The touch sensor source electrode 607 and the touch sensor drain electrode 608 contact a portion of the touch sensor active layer 604 not covered by the etch stopper 605.

In this embodiment, a portion of an upper surface of the touch sensor active layer 604, which contacts the etch stopper 605 may act as a channel, is protected by the etch stopper 605.

The protective layer 609 is formed on the touch sensor source electrode 607 and the touch sensor drain electrode 608. An insulating layer 611 is formed on the protective layer 609 and the opposite electrode 615 is formed on the insulating layer 611.

The insulating layer 611 includes an aperture part (or a recess) 611a, and the opposite electrode 615 is formed on the insulating layer 611 having the aperture part 611a. In this case, the aperture part 611a overlaps at least partially with the touch sensor active layer 604.

Similar to the previous embodiments, if a user accesses or touches the substrate 601, then the accessing or touching may be sensed by checking movement of hydrogen ions in the sensing unit 602.

Figure 7:
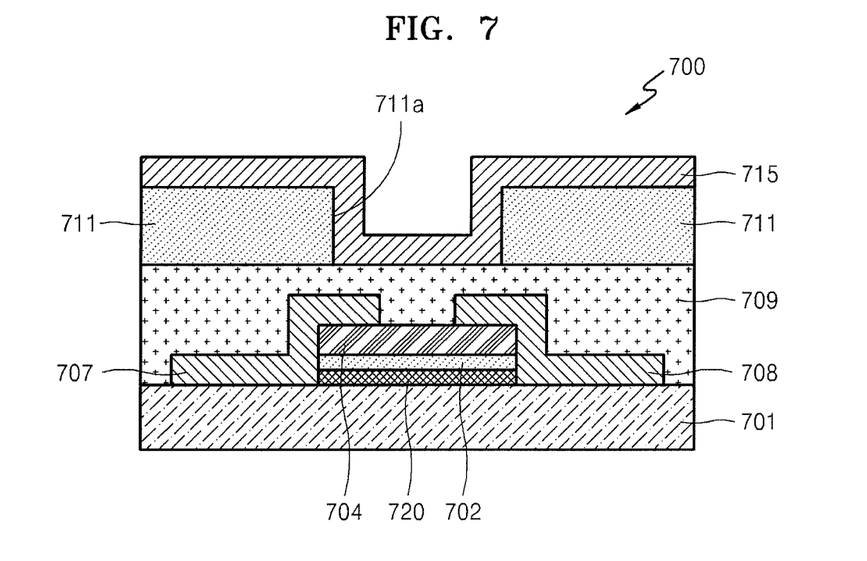
FIG. 7 is a schematic cross-sectional view of a touch sensor according to another embodiment of the present invention.

FIG. 7 is a schematic cross-sectional view of a touch sensor 700 according to another embodiment of the present invention. For convenience of explanation, the touch sensor 700 according to the current embodiment will be described focusing on differences between the touch sensor 700 and the touch sensors 100 to 600 of FIGS. 1 to 6. Referring to FIG. 7, the touch sensor 700 includes a substrate 701, a sensing unit 702, a touch sensor active layer 704, a light blocking layer 720, a touch sensor source electrode 707, a touch sensor drain electrode 708, a protective layer 709, and an opposite electrode 715.

The light blocking layer 720 and the sensing unit 702 are formed sequentially on the substrate 701. That is, the light blocking layer 720 is disposed between the substrate 701 and the sensing unit 702. The touch sensor active layer 704 is formed on the sensing unit 702. Electrical characteristics of the touch sensor active layer 704 may be changed by light. In particular, if the touch sensor active layer 704 contains an oxide, the electrical characteristics of the touch sensor active layer 704 may be changed by light. In the current embodiment, the light blocking layer 720 blocks light from being incident on the touch sensor active layer 704, thereby preventing the electrical characteristics of the touch sensor active layer 704 from being changed by the light.

The touch sensor source electrode 707 and the touch sensor drain electrode 708 are formed on the touch sensor active layer 704 and the substrate 701.

The protective layer 709 is formed on the touch sensor source electrode 707, the touch sensor drain electrode 708, the touch sensor active layer 704 and the substrate 701. An insulating layer 711 is formed on the protective layer 709 and the opposite electrode 715 is formed on the insulating layer 711. The insulating layer 711 includes an aperture part (or a recess) 711*a*, and the opposite electrode 715 is formed on the insulating layer 711 having the aperture part 711*a*. The aperture part 711*a* is formed to at least partially overlap with the touch sensor active layer 704. In detail, the aperture part 711*a* is formed to at least partially overlap with a portion of the touch sensor active layer 704 not covered by the touch sensor source electrode 707 or the touch sensor drain electrode 708.

Figure 8:
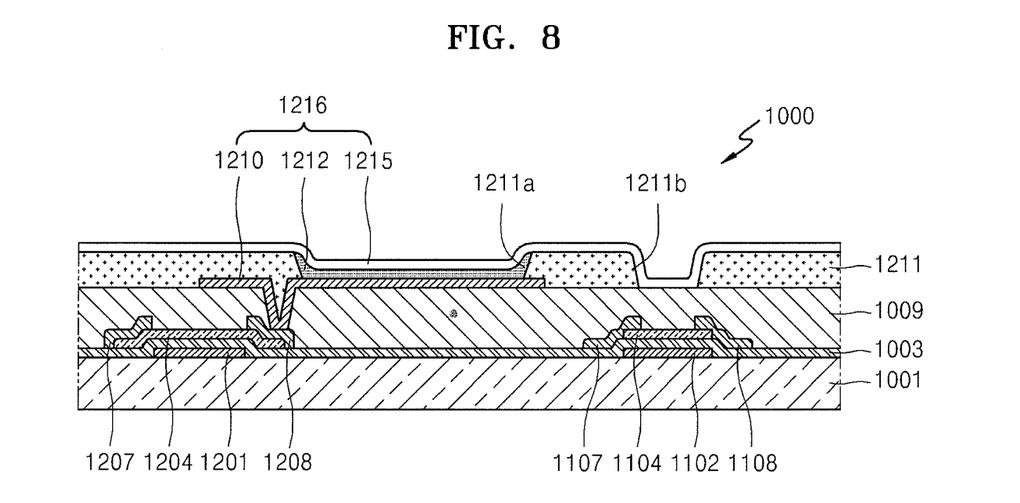
FIG. 8 is a schematic cross-sectional view of an organic light-emitting display apparatus according to an embodiment of the present invention.

Similar to the previous embodiments, if a user accesses or touches the substrate 701, the accessing or touching may be sensed by checking movement of hydrogen ions in the sensing unit 702. FIG. 8 is a schematic cross-sectional view of an organic light-emitting display apparatus 1000 according to an embodiment of the present invention. For convenience of explanation, a description of a touch sensor (or sensing element) included in the organic light-emitting display apparatus 1000 that is the same as those of the touch sensors 100 to 700 of FIGS. 1 to 7, is not provided here. Referring to FIG. 8, a structure of the touch sensor of the organic light-emitting display apparatus 1000 is similar to that of the touch sensor 500 of FIG. 5 but the present invention is not limited thereto and the touch sensor of the organic light-emitting display apparatus 1000 may be constructed to be similar to that of one of the other touch sensors 100 to 400, 600 and 700.

In the current embodiment, the organic light-emitting display apparatus 1000 includes a substrate 1001, a sensing unit 1102, a touch sensor active layer 1104, a touch sensor source electrode 1107, a touch sensor drain electrode 1108, a protective layer 1009, an organic light-emitting device 1216, and a pixel defining layer 1211. The organic light-emitting device 1216 includes a pixel electrode 1210, an opposite electrode 1215, and an intermediate layer 1212. The pixel electrode 1210 is electrically connected to a thin film transistor that includes a gate electrode 1201, an active layer 1204, a source electrode 1207, and a drain electrode 1208. In particular, the pixel electrode 1210 is electrically connected to the drain electrode 1208. In one embodiment, at least one element of the touch sensor is formed substantially simultaneously with at least one element of the thin film transistor.

The sensing unit 1102 is formed on the substrate 1001. In one embodiment, the sensing unit 1102 contains hydrogen ions. If a user touches the organic light-emitting display apparatus 1000 toward the substrate 1001, then hydrogen ions in the sensing unit 1102 may move toward the touch sensor active layer 1104. To this end, the sensing unit 1102 may be formed of any of various materials, e.g., SiNx or SiOx.

The gate electrode 1201 is formed to be spaced a predetermined distance apart from the sensing unit 1102 on the substrate 1001. The gate electrode 1201 may be formed of at least one of: Au, Ag, Cu, Ni, Pt, Pd, Al, and Mo, or an alloy formed of two or more metals, such as an Al:Nd alloy or a Mo:W alloy, but is not limited thereto and may be formed of any of other various conductive materials.

A gate insulating layer 1003 is formed on the gate electrode 1201 and the sensing unit 1102. The sensing unit 1102 and the touch sensor active layer 1104 do not contact each other and the gate electrode 1201 and the active layer 1204 are insulated from each other, via the gate insulating layer 1003.

The active layer 1204 and the touch sensor active layer 1104 are formed on the gate insulating layer 1003. The active layer 1204 and the touch sensor active layer 1104 may be formed of at least one of: oxide, amorphous silicon, or polycrystalline silicon.

The touch sensor source electrode 1107 and the touch sensor drain electrode 1108 are formed on the touch sensor active layer 1104.

The source electrode 1207 and the drain electrode 1208 are formed on the active layer 1204. The source electrode 1207 and the drain electrode 1208 may be formed of, but are not limited to, at least one of: Au, Pd, Pt, Ni, Rh, Ru, Ir, and Os, or an alloy of two or more metals, such as an Al alloy, an Mo alloy, an Al:Nd alloy, or an MoW alloy. The touch sensor source electrode 1107 and the touch sensor drain electrode 1108 may also be formed of, but are not limited to, at least one of: Au, Pd, Pt, Ni, Rh, Ru, Ir, and Os, or an alloy of two or more metals, such as an Al alloy, an Mo alloy, an Al:Nd alloy, or an MoW alloy.

The protective layer 1009 is formed on the source electrode 1207, the drain electrode 1208, the touch sensor source electrode 1107, and the touch sensor drain electrode 1108. The organic light-emitting device 1216 is further formed on the protective layer 1009. The organic light-emitting device 1216 includes the pixel electrode 1210, the intermediate layer 1212, and the opposite electrode 1215. The protective layer 1009 may be a planarization layer. The protective layer 1009 allows the pixel electrode 1210 and the intermediate layer 1212 to be formed as a plane.

The pixel electrode 1210 is formed on the protective layer 1009 and is electrically connected to the drain electrode 1208. In one embodiment, as shown in FIG. 8, the pixel electrode 1210 is formed to not overlap with the touch sensor active layer 1104. In this embodiment, the touch sensor active layer 1104 is not substantially directly below the pixel electrode 121*o*. Accordingly, touching by a user may be sensed precisely while not being influenced by the pixel electrode 1210.

The pixel electrode 1210 may be formed of, for example, ITO, IZO, ZnO, AZO, or In2O3 having a high work function.

The pixel defining layer 1211 is formed on the pixel electrode 1210. The pixel defining layer 1211 includes a first aperture part (or a first recess) 1211*a* and a second aperture part (or a second recess) 1211*b*. The first aperture part 1211*a* is formed to expose a predetermined part of the pixel electrode 1210. The second aperture part 1211*b* overlaps at least partially with the touch sensor active layer 1104. The second aperture part 1211*b* is formed to at least partially overlap with a portion of the touch sensor active layer 1104 not covered by the touch sensor source electrode 1107 and the touch sensor drain electrode 1108.

The intermediate layer 1212 is formed in the first aperture part 1211*a* so that the intermediate layer 1212 and the pixel electrode 1210 contact each other.

The intermediate layer 1212 includes an organic light-emitting layer. If a voltage is applied to the organic light-emitting layer from the pixel electrode 1210 and the opposite electrode 1215, then visible light is emitted from the organic light-emitting layer. If the organic light-emitting layer of the intermediate layer 1212 is formed of a low-molecular weight organic material, then a hole transport layer (HTL) and a hole injection layer (HIL) are disposed along the pixel electrode 1210 and an electron transport layer (ETL) and an electron injection layer (EIL) are disposed along the opposite electrode 1215, around the organic light-emitting layer of the intermediate layer 1212. Furthermore, various other layers may be formed on the intermediate layer 1212. The intermediate layer 1212 may be formed of at least one of: copper phthalocyanine (CuPc),
N,N'-Di(naphthalene-1-yl)-N,N'-diphenyl-benzidine (NPB), and
tris-8-hydroxyquinoline aluminum (Alq3).

If the organic light-emitting layer of the intermediate layer 1212 is formed of a high-molecular weight organic material, then only an HTL may be formed around the organic light-emitting layer of the intermediate layer 1212 along the pixel electrode 1210. In one embodiment, the HTL is formed on the pixel electrode 1210 by using poly-2,4-ethylene-dihydroxy thiophene (PEDOT) or polyaniline ((PANI) according to an inkjet printing method or a spin coating method. The organic light-emitting layer may be formed of at least one of: PPV, soluble PPV's, cyano-PPV, and polyfluorene. A color pattern may be formed according to a general method, such as the inkjet printing method, the spin coating method, or a thermal transfer method using laser.

The opposite electrode 1215 is formed to cover all of pixel patterns. That is, the opposite electrode 1215 not only contacts the intermediate layer 1212 disposed in the first aperture part 1211a but also is disposed in the second aperture part 1211b. If a voltage is applied to the opposite electrode 1215 via the second aperture part 1211b, the opposite electrode 1215 disposed in the second aperture part 1211b may apply an electric field to the touch sensor active layer 1102. If a voltage is applied to the touch sensor source electrode 1107 and the touch sensor drain electrode 1108, then current may flow from the touch sensor source electrode 1107 to the touch sensor drain electrode 1108.

The opposite electrode 1215 may be formed of any of various conductive materials and may be formed of at least one of: Ag, Mg, Al, Pt, Pd, Au, Ni, Nd, Ir, Cr, Li, and Ca.

A sealing unit (not shown) may be disposed on the opposite electrode 1215. The sealing unit protects the organic light-emitting device 1216 and other layers from being exposed to moisture or oxygen. The sealing unit may be formed of a transparent material. Thus, the sealing unit may be formed of glass or plastic or may have a stack structure formed of an organic material and an inorganic material.

In the current embodiment, the organic light-emitting display apparatus 1000 includes the touch sensor active layer 1104 to not overlap with the pixel electrode 1210 of the organic light-emitting device 1216. The organic light-emitting display apparatus 1000 further includes the sensing unit 1102 that contains hydrogen below the touch sensor active layer 1104, and includes the touch sensor source electrode 1107 and the touch sensor drain electrode 1108 to be connected to the touch sensor active layer 1104. Also, the opposite electrode 1215 is formed to cover the second aperture part 1211a of the pixel defining layer 1211 so that the touch sensor active layer 1104 may act as a channel.

Accordingly, the organic light-emitting display apparatus 1000 is easily capable of sensing touching or approaching by a user or an object. As described above, according to at least one embodiment, a touch sensor and organic light-emitting display apparatus are capable of easily sensing touching by a user, without significantly interfering with the manufacturing process of an organic light-emitting display.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A touch sensor comprising:
   a substrate;
   a sensing unit foamed on or over the substrate and containing hydrogen ions;
   a touch sensor active layer formed on or above the sensing unit, wherein the touch sensor active layer has a width substantially the same as that of the sensing unit;
   a touch sensor source electrode and a touch sensor drain electrode that are electrically connected to the touch sensor active layer;
   a protective layer covering the touch sensor source electrode and the touch sensor drain electrode; and
   an opposite electrode formed on the protective layer, wherein at least part of the opposite electrode is formed substantially directly above the touch sensor active layer.

2. A touch sensor comprising:
   a substrate;
   a sensing unit formed on or over the substrate and containing hydrogen ions;
   a touch sensor active layer formed on or above the sensing unit, wherein the touch sensor active layer has a width substantially the same as that of the sensing unit;
   a touch sensor source electrode and a touch sensor drain electrode that are electrically connected to the touch sensor active layer;
   a protective layer covering the touch sensor source electrode and the touch sensor drain electrode;
   an opposite electrode formed on the protective layer, wherein at least part of the opposite electrode is formed substantially directly above the touch sensor active layer; and
   an insulating layer formed between the protective layer and the opposite electrode, wherein a recess is formed in the insulating layer,
   wherein at least part of the recess is formed directly above the touch sensor active layer, and wherein the opposite electrode contacts the protective layer via the recess.

3. The touch sensor of claim 2, wherein part of the touch sensor active layer is covered by neither of the touch sensor source and drain electrodes,
   and wherein at least part of the recess is formed directly above the portion of the touch sensor active layer which is not covered by the touch sensor source and drain electrodes.

4. The touch sensor of claim 1, wherein the sensing unit is formed of a silicon-based oxide or a silicon-based nitride.

5. A touch sensor comprising:
   a substrate;
   a sensing unit formed on or over the substrate and containing hydrogen ions;
   a touch sensor active layer formed on or above the sensing unit, wherein the touch sensor active layer has a width substantially the same as that of the sensing unit;
   a touch sensor source electrode and a touch sensor drain electrode that are electrically connected to the touch sensor active layer;
   a protective layer covering the touch sensor source electrode and the touch sensor drain electrode;
   an opposite electrode formed on the protective layer, wherein at least part of the opposite electrode is formed substantially directly above the touch sensor active layer,
   a first etch stopper formed between i) the touch sensor active layer and ii) the touch sensor source and drain electrodes, wherein the first etch stopper contacts the protective layer, and wherein the touch sensor active layer does not contact the protective layer; and
   a second etch stopper having i) a bottom surface, ii) a top surface and iii) a side surface formed between the bottom and top surfaces, wherein the bottom surface is closer to the substrate than the top surface, wherein the top surface of the second etch stopper contacts i) a bottom surface of the touch sensor source electrode and ii) a bottom surface of the touch sensor drain electrode, and wherein the side surface of the second etch stopper contacts a side surface of the touch sensor active layer.

6. A touch sensor comprising:
a substrate;
a sensing unit formed on or over the substrate and containing hydrogen ions;
a touch sensor active layer formed on or above the sensing unit, wherein the touch sensor active layer has a width substantially the same as that of the sensing unit;
a touch sensor source electrode and a touch sensor drain electrode that are electrically connected to the touch sensor active layer;
a protective layer covering the touch sensor source electrode and the touch sensor drain electrode;
an opposite electrode formed on the protective layer, wherein at least part of the opposite electrode is formed substantially directly above the touch sensor active layer; and
an intermediate insulating layer at least part of which is formed between the sensing unit and the touch sensor active layer.

7. The touch sensor of claim 6, wherein a contact hole is defined in the intermediate insulating layer, and wherein the sensing unit and the touch sensor active layer contact each other via the contact hole.

8. The touch sensor of claim 1, further comprising a light blocking layer formed between the substrate and the sensing unit, wherein the light blocking layer is formed substantially directly below the sensing unit, wherein the light blocking layer has a first length, wherein the sensing unit has a second length, wherein the first and second lengths are defined in a direction substantially parallel with the substrate, and wherein the first and second lengths are substantially the same.

\* \* \* \* \*